Aug. 18, 1936.    F. RIEBER    2,051,153
METHOD AND APPARATUS FOR RECORDING ELASTIC WAVES
Filed Dec. 22, 1934    2 Sheets-Sheet 2

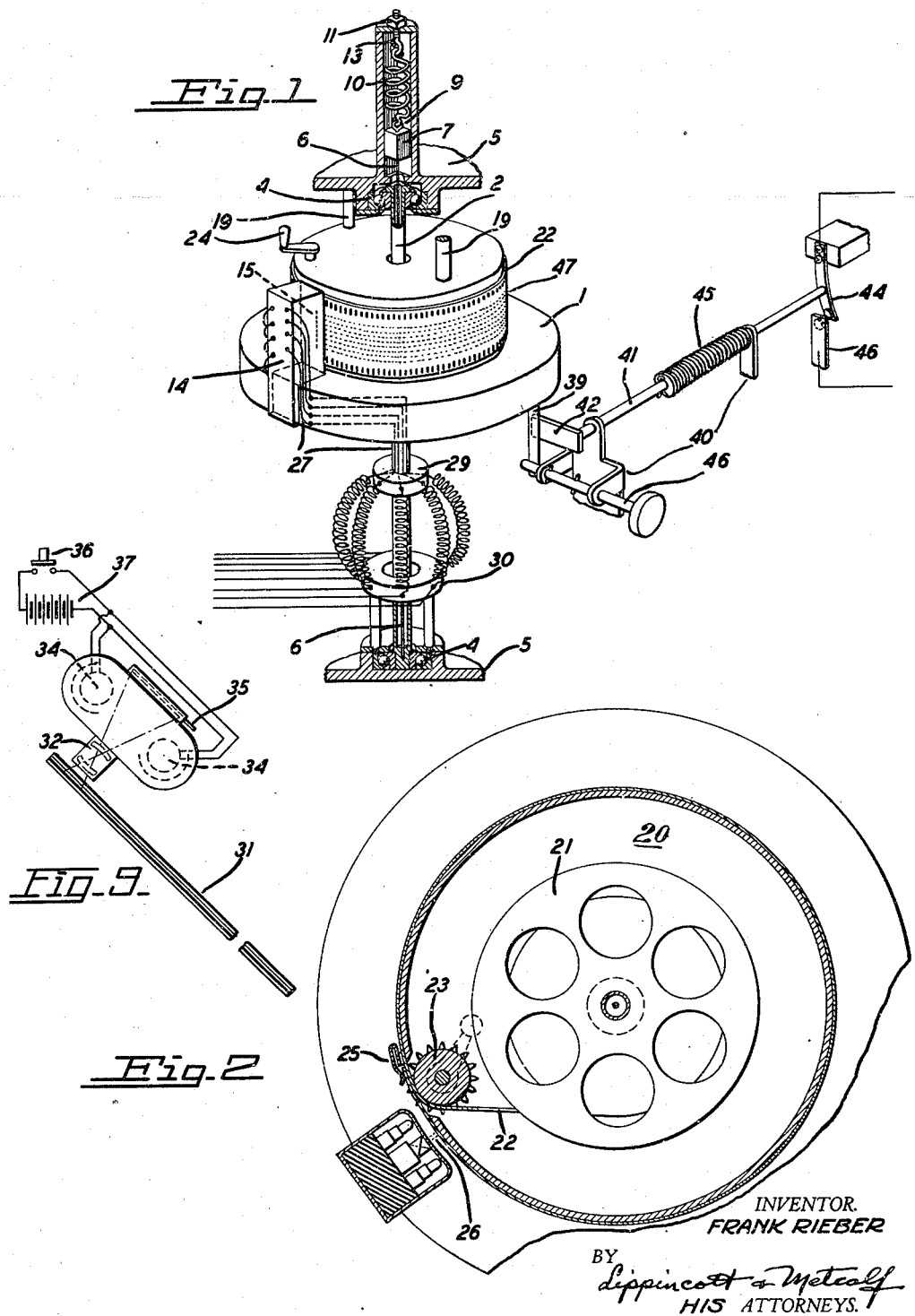

CYCLES PER SECOND

CYCLES PER SECOND

INVENTOR.
FRANK RIEBER
BY Lippincott & Metcalf
HIS ATTORNEYS.

Patented Aug. 18, 1936

2,051,153

UNITED STATES PATENT OFFICE 2,051,153

METHOD AND APPARATUS FOR RECORDING ELASTIC WAVES

Frank Rieber, Los Angeles, Calif.

Application December 22, 1934, Serial No. 758,834

15 Claims. (Cl. 181—0.5)

My invention relates to a method and apparatus by which elastic motions of solids, liquids and the like may be detected and recorded in a form more readily interpreted than in previous methods or apparatus used for this purpose.

My invention has particular application to the art of geophysical exploration in which motions of the earth initiated by explosions are detected and recorded at a distance, the records used thereafter to furnish data from which geological structure may be deduced and plotted.

The general method of geophysical exploration by means of elastic waves within the earth has long been known. In general this method comprises initiating an impulse somewhere within the earth's crust, and recording the resultant earth movement at a point more or less spaced from the point of origin of the impulse, in such manner that the time elapsing between the instant of the impulse and the ensuing recorded movement may be determined. The original impulse sets up an elastic wave which is transmitted through the earth, and this wave, in general, will comprise a damped wavetrain. Any discontinuity or variation of structure within the earth will reflect and/or refract this wavetrain or a portion thereof, so that the record made at the receiving point will comprise a number of arriving waves, each derived from the original impulse, and each differing from the others in time of arrival, magnitude or both. The information desired is derived from the record by determining the instant of each successive arrival.

Where the discontinuities in structure are widely separated and large in magnitude, i. e., where the strata are thick and the differences in density or elasticity as between adjacent strata are large, fairly satisfactory results have, in the past, been obtainable from this method. But where the strata are thin and the differences in density and elasticity as between the strata are small, the record will be the result of an extremely large number of wavetrains of similar magnitude and random phase. Such a record is of extremely complex character. The determination of the instant of arrival of the various trains can only be approximated by rule of thumb methods wherein the proportional errors are large, and the information to be gained from the record is so unreliable and contradictory as to make the method of little value.

In practice two general modifications of the general method have been used. In the first, usually known as "refraction shooting", the earth movements at a point rather widely separated from the point of origin of the impulse are recorded, the information-bearing waves reaching the receiver along refracted paths of such length that those portions of the wave arriving through deeper-lying strata reach the receiver before those transmitted wholly through the surface layers, owing to the higher velocity of propagation in the deeper and denser material. This modification is tedious and uneconomical, since a large number of records of high intensity shots must be made to get the required data.

In the second modification, usually known as "reflection shooting", the receiving point is relatively close to the wave source, and the waves reach the receiver along reflected paths, arriving seriatim as reflected from the surfaces of successively deeper strata. This modification is more economical of explosives, since the wave paths are shorter and the distance attenuation of the received waves is correspondingly less, and since more information is obtainable from a single shot. The arrivals are more closely spaced, however, and the confusion of the record is accordingly greater, and owing to the difficulty of interpretation the method has met with little success in comparison to its theoretical advantages.

In the interpretation of either type of record the general practice is to determine the instant of the peak of the greatest amplitude within the range of the record under immediate examination, and to assume that this peak occurred at a definite time interval after the first arrival of the wave impulse. Since, however, a newly arriving wave may appear on the record as either an increase, or decrease in amplitude, or as a mere change of phase, depending on whether the new arrival is in or out of step with a previous arrival, the errors involved may easily be so great as to destroy wholly the value of the interpretations for any except the simplest structures.

With the exception of records made in a few favorable regions, most of the oscillographic records made in the manner described immediately above are of such a complex waveform as to entirely defy solution by visual inspection. In my application, Serial No. 746,681, filed October 3, 1934, I have described a method whereby such complex records are directly analyzed.

In general terms, the method of my copending application above referred to comprises recording an arriving wavetrain or group thereof, and subsequently re-recording a group of components derived from the original record at different time phases, in such manner that the derived components are combined in a phase relation which suppresses or "phases out" undesired components, while accentuating or adding the desired components, and more particularly the transient impulses which initiate the waves. Preferably the method involves making the initial record in phonographic form, i. e., of such a character that it may be translated into electrical currents or mechanical movements, and the record may therefore be made by any of the known processes which are employed in the phonographic recordation and reproduction of sound. Once recorded, the record is "reproduced" or translated from a plurality of points which differ in time phase relative to the record. Most conveniently, electrical reproduction is used, and the currents from the plurality of reproducing points are mixed and utilized to operate an analyzer. The analyzer may conveniently comprise a recording galvanometer, which records the amplitude of the combined components and records them in visible form as a graph or analyzer trace.

This present application deals solely with a means and method of initiating and recording the complex arriving waves by making use of a novel series of electrical, mechanical and optical steps which in themselves tend to clarify the record so that interpretation by even visual methods becomes simpler and more positive than previous devices or methods; and, when used in conjunction with the inventions referred to in the application mentioned above, may be interpreted mechanically and electrically with practical certainty. The end result is that the method of my invention herein described may be used to produce interpretable tracks or records in regions where other methods give doubtful results or no understandable data whatsoever.

Among the objects of my invention, therefore, are: To provide a method for recording elastic waves which is simple and positive in action, and which requires a minimum of attention or adjustments; to provide a method of recording elastic waves which will limit the range of vibratory frequency over which such waves will be recorded without having recourse to the customary filters or other usual limiting means; to provide a method for recording elastic waves generated or initiated by explosions in the earth, which will provide a wider range of recorded amplitudes than is possible with prior forms of apparatus; to provide a method and apparatus for recording elastic waves, the produced record being particularly adapted for analysis in conjunction with the invention described in my copending application referred to above; and to provide an improved form of record track for impulses generated within the earth.

My invention possesses numerous other objects and features of advantage, some of which, together with the foregoing, will be set forth in the following description of specific apparatus embodying and utilizing my novel method. It is therefore to be understood that my method is applicable to other apparatus, and that I do not limit myself, in any way, to the apparatus of the present application, as I may adopt various other apparatus embodiments, utilizing the method, within the scope of the appended claims.

In the drawings:

Figure 1 is a view partly in section and partly in perspective of a preferred recording mechanism.

Figure 2 is a sectional view taken in a horizontal plane through the film magazine of the device shown in Figure 1.

Figure 9 is a plan view of a film titling assembly arranged in a position to receive exposed film from the recorder shown in Figures 1 and 2. The titling assembly is illustrated in the proper position to receive film tangentially directed from the recorder of Figure 2.

Figure 3:
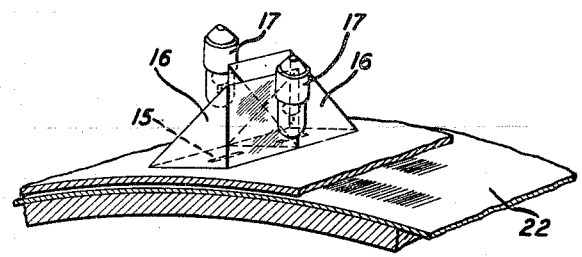
Figure 3 is a perspective view of two optical systems.

In broad terms of method my invention comprises the steps of translating earth vibrations into electrical impulses and recording these impulses in the form of a reproducible phonographic track. Preferably several tracks are made, the vibrations being picked up at different distances from the source thereof, and the tracks recorded side by side on a single film, along with the time of the initial earth disturbance.

In broad terms of apparatus my invention comprises means for setting up earth vibrations at some designated point, preferably by means of the explosion of a charge of dynamite. I then position a plurality of receptors in selected locations, preferably spaced, adapted to receive reflected and refracted waves caused by the explosion and translate them into electrical impulses. The electrical impulses from these receptors are led through the proper amplifiers to a recording mechanism where the impulses received by each of the receptors are recorded side by side on a single film, or at least on record strips which may be coordinated one with another.

I also prefer to provide a timing trace on the record and a trace which will record the instant of explosion as related to the records.

I prefer to record the impulses received from the receptors in the form of variable density records, although I consider a variable area record the complete equivalent thereof. Heretofore earth impulses have customarily been recorded as a visual trace, and in this specification the term "phonographic record" is used to distinguish the tracks recorded in the utilization of my method from the prior tracks which are reproducible only in the sense that they may be duplicated by photography or similar process, whereas the records of my invention are reproducible in that they may be used in a reproducer to produce electrical impulses which can be analyzed as to their component parts and again recorded in terms of the complete whole or the separate parts. Under this definition magnetic records on soft iron wire and wax recordings or the like are again considered full equivalents. In other words, the phonographic records referred to herein are adapted for subsequent recreation of their waveforms wherein the recreating systems, if desired, may be so adjusted as to modify the output thereof by selecting a desired range of components or types of motion and eliminating others. It is therefore apparent that the tracks herein described do not necessarily show visible evidences of vibrational relationships for, as explained above, there are many areas unfavorable for the production of such favorable records. When the records do not show directly and visibly relationships of earth vibrations, I have been able, because of the reproducibility of the records, to analyze them mechanically and/or electrically, as above pointed out.

I prefer to describe my invention first by referring to the apparatus utilized and follow with a discussion of the methods involved in the use of this apparatus. I therefore will refer to a preferred form of recorder shown in Figure 1.

As earth vibrations set up by an explosion within the earth do not last a great length of time, I have found that the vibrations which I desire to be recorded can be recorded within the extent of one rotation of a circular drum. I have therefore designed an upright recorder comprising a heavy fly wheel 1 supported on a hollow vertical shaft 2, this shaft being mounted in ball bearings 4—4, one above and one below the fly wheel. I prefer to support these bearings on the upper and lower walls 5—5 of a casing surrounding the entire device, the major part of the casing being omitted for clarity of illustration.

As the fly wheel is preferably relatively heavy and does not need to rotate a complete revolution, it is supported by a ligament 6 fastened to the lower end of the shaft and extending upwardly through the hollow of the shaft to terminate in a square block 7 sliding in a square recess 9 in an extension of the upper wall 5. The major portion of the weight of the fly wheel is carried by a coil spring 10, the amount of weight remaining on the bearings being regulated by an adjustment nut 11 bearing against the upper wall 12 of the square recess 9 and engaging a spring link 13. I prefer to adjust the tension of the spring 10 so that there is practically no weight on the bearing, the thrust being almost entirely radial. The fly wheel is mechanically balanced as far as possible and is supported substantially in horizontal position.

At a point on the periphery of the fly wheel I position a recorder block 14 having therein recording lamps preferably arranged as shown in Figure 3. As it may be desirable to record as many as twelve tracks on a single film, I prefer to utilize a combination of lamps, prisms and slits so that a large number of recording lamps may be positioned within a small space. I do this by providing the wall of the recorder block nearest the axis of the fly wheel with a plurality of slits 15 extending vertically and preferably in line, and over each slit I position a small prism 16 and then I position a recording lamp 17 at one side so that the light therefrom may be reflected from the back wall of the prism through the slit. Alternate prisms are reversed and the lamps are staggered. For reasons hereafter referred to, I prefer to utilize incandescent lamps for my light sources and prefer that type of lamp well known in the medical art as "cystoscope" lamps. They are small, reliable and have response characteristics which I utilize to obtain certain favorable results. Even though the lamps are small, having an over-all length of .490 inches and a base diameter of .140 inches, it would not be practical to put them and their sockets in line over the slits and still obtain twelve tracks on a thirty five millimeter film, which I propose to use in recording. The staggered arrangement, however, allows the use of twelve lamps within the recorder block without difficulty.

Suspended from the upper wall 5 of the recorder casing by pins 19 is a film magazine 20 shown in section in Figure 2. The magazine is hollow and contains an axially positioned, horizontal film reel 21, a film 22, preferably thirty five millimeter standard motion picture stock feeding from the reel onto a sprocket 23, preferably rotated from outside and above the magazine by a handle 24 or similar device. The film is then passed around the periphery of the film magazine with the emulsion side out until it again engages the teeth of the sprocket 23. I prefer to make the circumference of the drum such that the film is held tightly against the drum without wrinkling, and if desired the end of the film may be secured by a flat clip 25. As the fly wheel rotates less than one revolution, the film clip will not interfere with the rotation of the recording block.

I also prefer to make the diameter of the film magazine such that the emulsion surface of the film will closely approach the slits in the recording block, the distance in Figure 2 being greatly exaggerated in order that the light path indicated by the dotted line 26 might be shown. The arrangement is such that each of the slits, when illuminated, will form a separate image upon the film between the sprocket holes thereof. Recording lamp leads 27 are brought down the outside of the fly wheel and the shaft onto a rotating collar 29 and thence to jump, in closely coiled formation, onto a stationary collar 30 supported by the lower wall 5 of the casing. I also prefer to bow these leads somewhat so that during the rotation of the fly wheel, substantially no resistance thereto is offered by the rotation of the leads. The leads may then pass to auxiliary modulating apparatus.

As I desire to label each record strip after it is made, I position preferably on the same foundation, level with the plane of the film and tangentially extending toward the drum and terminating adjacent thereto, a film slide 31 having a titling projector 32 positioned to throw on the film light from title lamps 34 after having been reflected from a title card 35. After a record has been made the film is released from the drum and directed tangentially into film slide 31. Various information regarding that particular record strip may be placed on the title card, the card placed in the projector, and the lamps lit by pressure on a title switch 36 energizing the title lamps through a lamp battery 37, thus exposing the film to light reflected from the card.

As it is not necessary to rotate the drum a full revolution, I provide a spring mechanism for initiating rotation. A driving pin 39 is attached to the fly wheel and projects downwardly. A firing bracket 40 supports a spring pin 41 having on one end a hammer 42 and on the other a firing contact 44. A firing spring 45 is positioned to extend the hammer against the driving pin 39 of the fly wheel. The firing bracket, however, also carries a trigger pin 46 which may be pushed in to engage the side of the driving pin opposite to that engaged by the hammer, and in order to cock the mechanism the fly wheel is rotated until the driving pin bears against the hammer 42 and thereafter to compress the spring 45 until the driving pin may be caught by the trigger pin. This procedure bends the firing contact 44 away from a stationary contact 46 so that any circuit connected to these two contacts is open. The recording block is positioned so that it is at the beginning of the film strip, ready to record thereon. The dotted lines 47 on the film indicate the path of the recorded tracks when the fly wheel is rotated.

In order to start the mechanism when cocked, all that is necessary is to pull out the trigger pin 46. The spring then pushes the hammer against the driving pin and the fly wheel rotates. At the same time the release of the hammer allows the touching of the contacts 44 and 46, the circuit closed thereby being preferably used to initiate an explosion in the earth. When the fly wheel is rotated about 300°, which I have found is all that is necessary at a peripheral speed of approximately 5 to 10 inches per second, the driving pin enters a spring latch, not shown, which stops the wheel. The film with a record thereon may then be passed through the titling device, as heretofore described, titled and removed, and a new strip of film cranked into recording position. The fly wheel is again cocked, ready for the next run.

Figure 6:
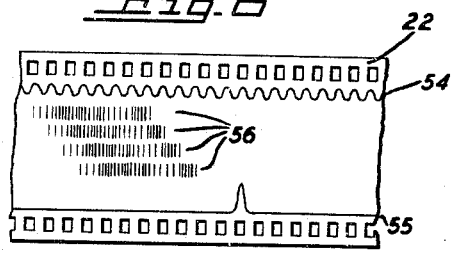
Figure 6 is a plan view of a portion of a film record.
Figure 8:
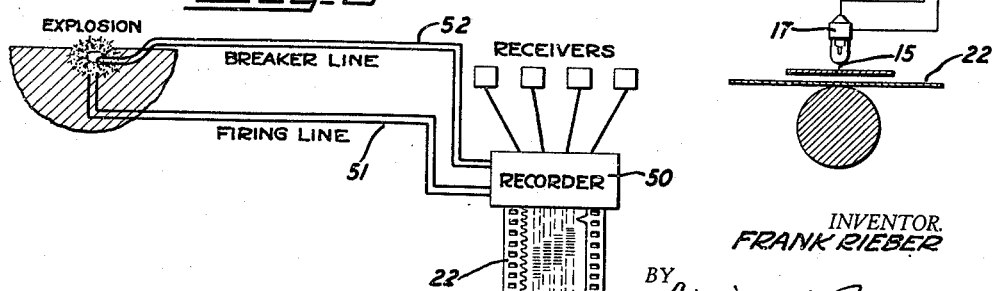
Figure 8 is a diagrammatic representation of a system utilizing a plurality of recording channels.

The broad set-up of my apparatus, when connected to record earth vibrations, is shown diagrammatically in Figure 8. The recorder 50 in this case has four receiver lamps controlled by receptors; the firing line 51 is connected to contacts 44 and 46 and goes to the detonator of a dynamite charge; and a breaker line 52 is so positioned in the neighborhood of the explosion that it may be broken by the explosion and thus transfer a recordable impulse to the recorder. I therefore prefer to record on the film through a light beam similar to those described for the record tracks, the instant of the explosion by means of the interruption of the breaker line; and also, for purposes of time coordination, a timing track controlled by a tuning fork or similar device. The complete film therefore will contain records as shown in Figure 6; a time trace 54, an explosion trace 55, and the variable density tracks 56 caused by modulation of the recording lamps through the action of the various receptors.

Figure 7:
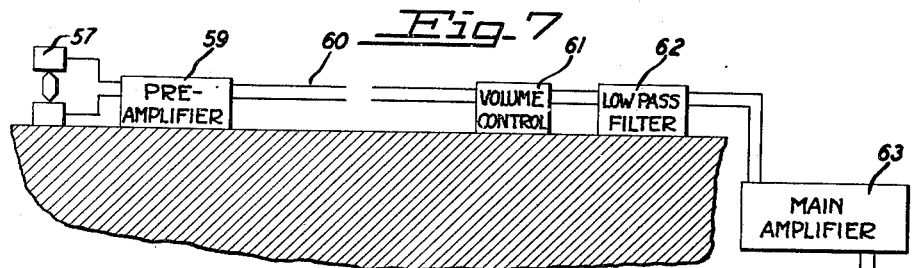
Figure 7 is a diagrammatic representation of a single recording channel.

Each receiver line comprises the following main elements as shown in Figure 7: An earth vibration receptor 57, preferably an acceleration responsive pickup such as a piezo-electric crystal which feeds a pre-amplifier 59, usually positioned fairly close to the receptor. From the pre-amplifier a field cable 60 leads to volume control 61, sometimes a low pass filter 62, and a main amplifier 63 which supplies modulations to the individual recording lamp 17, the light thereof passing through slit 15 onto the film. It is customary to position the volume controls, filters and amplifiers, together with the unitary recorder, in a truck, in order that the system may be highly portable.

Figure 5:
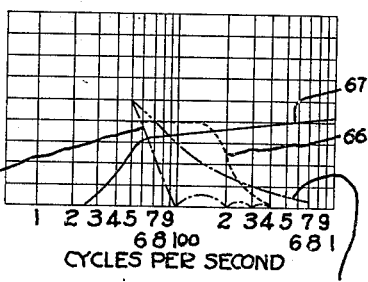

I prefer to utilize certain characteristics of my apparatus to produce certain definite results. I have found, for example, that the frequencies of earth vibrations with which I am concerned lie principally between 40 and 100 cycles per second. I have therefore designed the constants of various portions of my circuits in order to eliminate as far as possible other frequencies which will not only give me no information but which will, if allowed to be recorded, mask to a certain extent the impulses which I desire to analyze. I design the receptors, from a point of view of the weight resting on the piezo-electric crystal, so that they will have their main resonance point above the frequencies with which I am concerned, perhaps in the neighborhood of 500 cycles or more, and so that they will have a rising characteristic in the vicinity of 50 cycles. Such a curve is shown diagrammatically by a double dot and dash line curve 65 in Figure 5.

Figure 4:
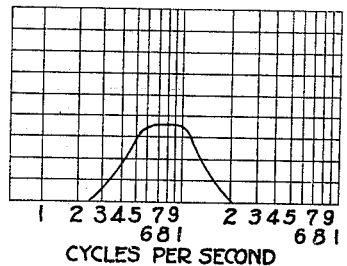
Figures 4 and 5 are graphs showing response curves.

I have found, however, that the recording lamps which have a filament diameter of only .0005 inches have a maximum response in the neighborhood of 50 cycles with a rapidly falling characteristic above. Such a curve is shown by the dotted line curve 66 in Figure 5. The rising characteristic of the receptor cancels, to a large extent, the falling characteristic of the lamp filament in the general neighborhood of 50 cycles. In addition, in some cases, I find it advantageous to provide my main amplifiers with a response characteristic having a knee at approximately 50 cycles, cut-off being rather steep below this point. Such a characteristic is shown by the solid line curve 67 in Figure 5. In addition, I prefer to use, in conjunction with the film speed of ten inches per second, a slit length in the direction of film motion of approximately .1 of an inch, this giving an effective cut-off at around 100 cycles (curve 68). The combined effect of all these characteristics gives an over-all recording characteristic such as shown in Figure 4 where the main response is from 40 to 150 cycles, thus eliminating from my record any substantial components above 100 cycles, the most useful waves being from 40 to 50 cycles.

I have therefore provided a recording system which allows earth waves created by a single explosion to be picked up from a plurality of locations, preferably at differing distances from an explosion, and recorded side by side together with a time trace and a trace indicating the instant of explosion. The arrival of the waves at the various receptors will naturally differ in time, and it is the instants of arrival of the wave trains and their relationship one to the other that gives me the information I desire, from which I may interpret the condition of the earth below the surface. By the proper design of my apparatus I have substantially eliminated interfering frequencies which carry no information. I have selected those frequencies which carry the information I desire, and I have recorded them in the form of reproducible records side by side so that time relationships of one track to another may be recovered. As has been pointed out above, it may be that the initial arrivals of the waves can be ascertained visually by inspection of the records. This, however, occurs only in favorable locations and unless these record tracks were in reproducible form, no information could be gained by visual inspection thereof. However, by means of the apparatus referred to above as covered by my prior application, tracks recorded as described can be reproduced in such manner as to change the phase, the relationships of the wavetrains, or to shift and eliminate various components in such a manner that a new record can be made which will clearly and permanently reveal the arrival times and their time relationships, something which cannot be done with tracks as heretofore recorded.

I claim:

1. In combination with means for translating earth vibrations into electrical impulses, means for recording said impulses in the form of a phonographically reproducible record.

2. In combination with means for translating earth vibrations into electrical impulses, means for recording said impulses in the form of a phonographically reproducible variable density record.

3. In combination, means for causing disturbance within the earth, means spaced from the point of origin of said disturbance for translating the vibrations resulting from said disturbance into electrical impulses, and means for recording said impulses in the form of a phonographic record.

4. In combination, means for causing a disturbance within the earth, a plurality of means for translating the vibrations resulting from said disturbance into electrical impulses, each of said means being spaced a different distance from the point of origin of said disturbance, and means for recording said impulses in the form of separate coordinated phonographic record tracks.

5. In combination, means for causing a disturbance within the earth, a plurality of means for translating the vibrations resulting from said disturbance into electrical impulses, each of said means being spaced a different distance from the point of origin of said disturbance, and means for recording said impulses on a single sensitized surface in the form of separate phonographic records.

6. In combination, means for causing a disturbance within the earth, a plurality of means for translating the vibrations resulting from said disturbance into electrical impulses, each of said means being spaced a different distance from the point of origin of said disturbance, and means for recording said impulses on a single sensitized surface in the form of parallel variable density records.

7. Means for recording electrical impulses comprising a cylindrical sensitized surface, a plurality of separate light beams impinging on said film along a line parallel with the axis of said surface, means for changing the intensity of said beams, and means for rotating said beams around said surface to produce a plurality of parallel phonographic records thereon.

8. Means for recording electrical impulses comprising a cylindrical sensitized surface, a plurality of separate light beams impinging on said film along a line parallel with the axis of said surface, means for modulating said light beams in accordance with the form and amplitude of earth vibrations, and means for rotating said beams around said surface to produce a plurality of parallel records thereon.

9. Means for recording a plurality of adjacent parallel record tracks on a sensitized film comprising a plurality of slits extending in a line across said film, a light source for each slit alternately positioned at the sides of said line of slits, and a prism cooperating with each slit to deflect the light therefrom through said slit, said prisms being alternately reversed to compensate for the change in position of said sources.

10. The method of geophysical survey which comprises creating a localized disturbance in the earth, translating the vibrations resulting from said disturbance into electrical impulses at a point apart from said disturbance, and recording said impulses as a reproducible phonographic record.

11. The method of geophysical survey which comprises creating a localized disturbance in the earth, translating the vibrations resulting from said disturbance into electrical impulses at a plurality of points spaced at different distances from said disturbance to produce a plurality of trains of electrical impulses differing in time phase, and simultaneously recording the separate trains as reproducible phonographic records.

12. The method of geophysical survey which comprises creating a localized disturbance in the earth, translating the vibrations resulting from said disturbance into electrical impulses at a plurality of points spaced at different distances from said disturbance to produce a plurality of trains of electrical impulses differing in time phase, recording the separable trains concurrently as reproducible phonographic records, and simultaneously recording a time trace related to all of said records.

13. The method of geophysical survey which comprises creating a localized disturbance in the earth, translating the vibrations resulting from said disturbance into electrical impulses at a plurality of points spaced at different distances from said disturbance to produce a plurality of trains of electrical impulses differing in time phase, recording the separate trains concurrently as reproducible phonographic records, simultaneously recording a time trace related to all of said records, and recording the time said disturbance occurred.

14. The method of geophysical survey which comprises creating a localized disturbance in the earth, translating the vibrations resulting from said disturbance into electrical impulses at a plurality of points spaced at different distances from said disturbance to produce a plurality of separate trains of electrical impulses differing in time phase, and simultaneously recording side by side, the separate trains as reproducible phonographic records, a time trace, and a trace showing the time said disturbance occurred.

15. The method of geophysical survey which comprises creating a localized disturbance in the earth, translating the vibrations resulting from said disturbance into electrical impulses at a plurality of separated points to produce a plurality of trains of electrical impulses, and coordinately recording the separate trains as reproducible phonographic records.

FRANK RIEBER.